E. W. WEBB & C. S. WALTON.
CAR BRAKE ACTUATING MECHANISM.
APPLICATION FILED NOV. 13, 1915.

1,187,686.

Patented June 20, 1916.
2 SHEETS—SHEET 1.

Witnesses
A. H. Opsahl
E. C. Skinkle

Inventors
Edwin W. Webb
Charles S. Walton
By their Attorneys
Williamson Merchant

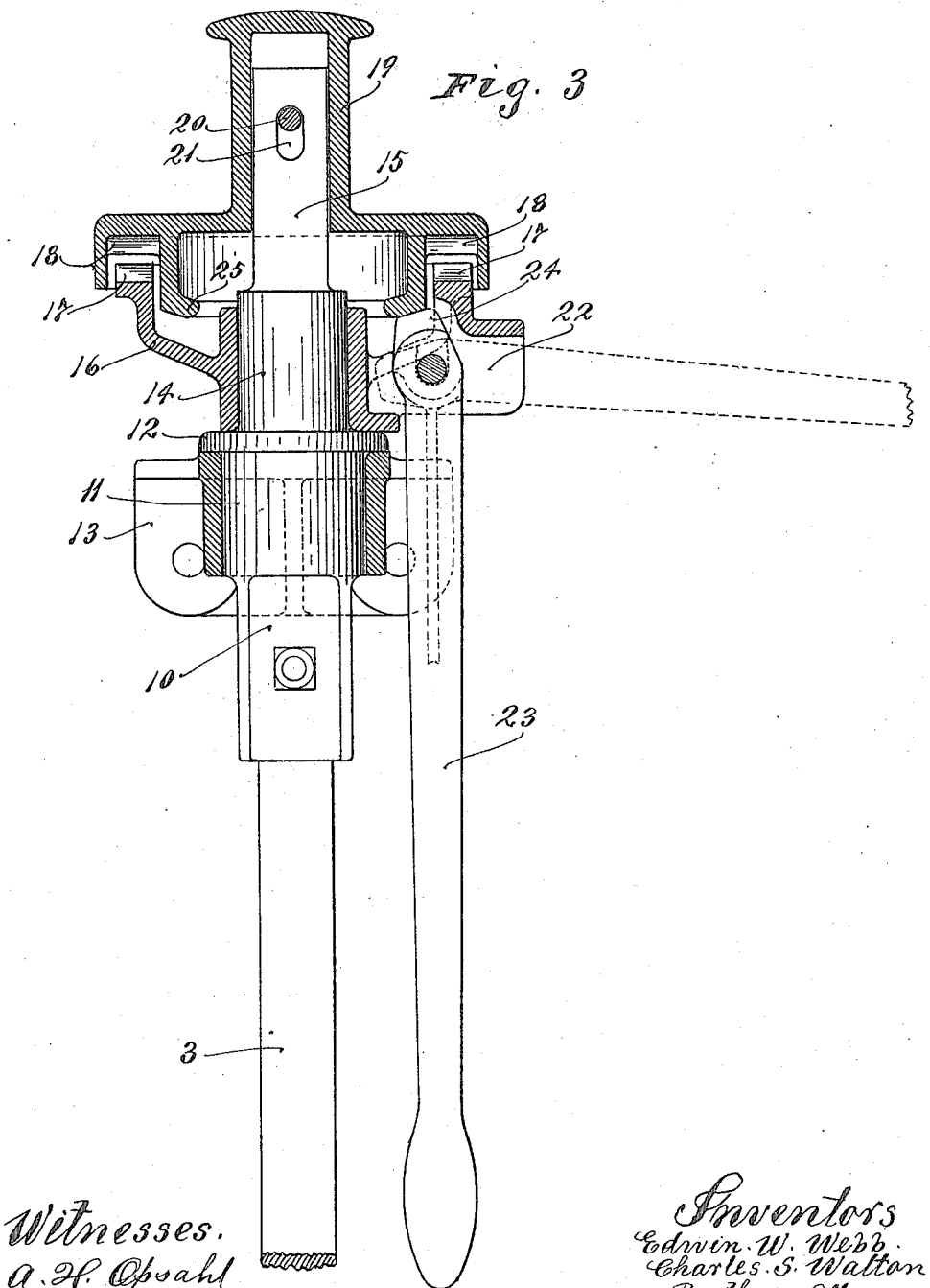

UNITED STATES PATENT OFFICE.

EDWIN W. WEBB AND CHARLES S. WALTON, OF CHICAGO, ILLINOIS, ASSIGNORS TO STANDARD CAR TRUCK COMPANY, OF CHICAGO, ILLINOIS, A CORPORATION OF NEW JERSEY.

CAR-BRAKE-ACTUATING MECHANISM.

1,187,686. Specification of Letters Patent. Patented June 20, 1916.

Application filed November 13, 1915. Serial No. 61,237.

*To all whom it may concern:*

Be it known that we, EDWIN W. WEBB and CHARLES S. WALTON, citizens of the United States, residing at Chicago, in the county of Cook and State of Illinois, have invented certain new and useful Improvements in Car-Brake-Actuating Mechanism; and we do hereby declare the following to be a full, clear, and exact description of the invention, such as will enable others skilled in the art to which it appertains to make and use the same.

Our invention has for its object to provide an extremely simple and highly efficient car brake actuating mechanism and is in the nature of a modification of the brake actuating mechanism disclosed and more broadly claimed in our companion application of the same title, executed by us, of even date herewith.

Brake mechanism of this character may be generally applied to railway cars, either passenger or various types of freight cars and it will operate even when applied against the end of a car, or elsewhere, where a complete rotation of an actuating lever of the required power will be impossible.

In the accompanying drawings which illustrate the invention, like characters indicate like parts throughout the several views.

Figure 1:
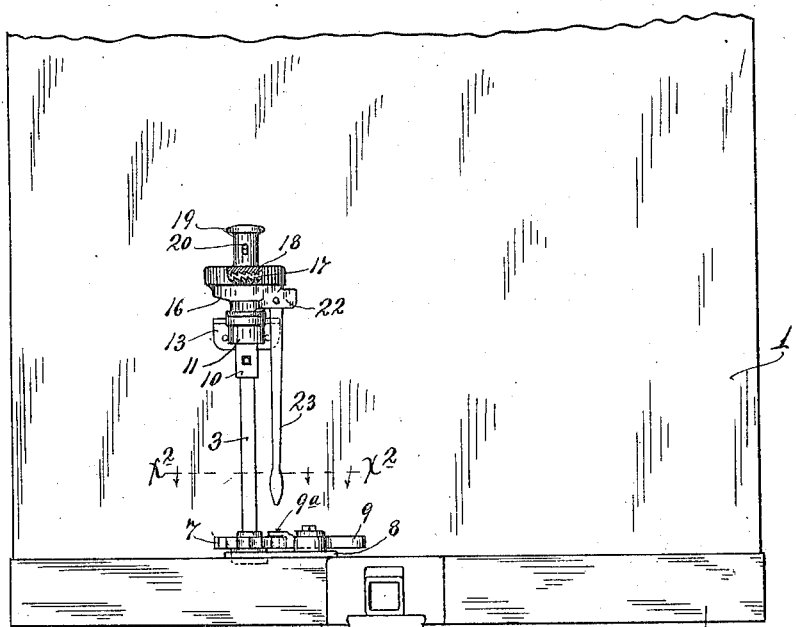
Figure 2:
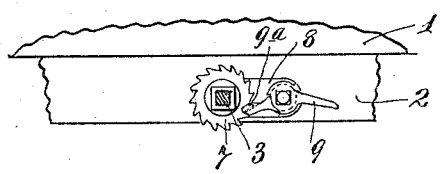
Figure 4:
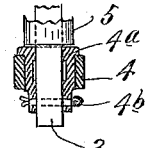

Referring to the drawings: Figure 1 is an elevation showing the improved brake actuating mechanism applied to the end of a box car; Fig. 2 is a horizontal section taken on the line $x^2$ $x^2$ of Fig. 1; Fig. 3 is a vertical section of the lever and ratchet connections to the brake staff, some parts being shown in full; and Fig. 4 is a section on the line $x^4$ $x^4$ of Fig. 1.

In Figs. 1 and 2, the numeral 1 indicates the body and the numeral 2 one of the end sills of the box car.

The brake staff 3 is preferably made of square iron or steel and at its lower end is passed through the sill 2 and journaled in a yoke-like bracket 4 bolted or otherwise rigidly secured to the sill 2. Within the bracket 4, the brake staff 3 has a rigidly secured winding spool 5 which is preferably of the type that takes up slack of the brake chain 6 quickly at first and slower as the chain is wound upon the said spool, in the brake setting action. Above the sill 2 the brake staff has a rigidly secured ratchet wheel 7, which, in a square brake staff is provided with a square hole through which the said staff is passed. This ratchet wheel rests upon a bearing plate 8 secured to the sill and to which is pivoted a lock dog 9 that coöperates with the said ratchet wheel to hold the brakes set. The lower end of the staff 3 fits the square axial seat of a cylindrical bushing $4^a$ that is directly journaled in the bracket 4 and has a flange at its upper end that rests upon the lower portion of the said bracket. A pin or cotter $4^b$ is passed through the lower end of the bushing and through the staff 3, as best shown in Fig. 4, and thus holds the staff against both upward and downward movements.

At its ratchet engaging end the dog 9 is provided with a projecting lip $9^a$ (see Figs. 1 and 2) that always projects over the teeth of the ratchet wheel 7 and prevents the said ratchet wheel from rising on the said staff even when no other means is provided, that is, when the said ratchet wheel is otherwise free for vertical movements on the said staff.

At its upper end, the brake staff 3 is shown as telescoped into the square seat of a brake staff extension 10. This extension 10 preferably has a cylindrical journal 11 and an annular flange 12, the former of which is journaled in and the latter of which rests upon a bearing bracket 13 that is bolted, or otherwise rigidly secured to the end of the car, for the particular application illustrated, but which might be secured to any suitable part of a car in the other possible applications of the brake mechanism.

Above the flange 12, the brake staff extension has a reduced cylindrical portion 14 and above the latter has a square reduced portion 15. A wheel 16 is journaled on the said cylindrical portion 14, and is provided with an annular series of upstanding ratchet teeth 17 that are engageable with a corresponding depending annular series of ratchet teeth 18 formed on the outstanding web of the cast cap 19 that has a square hub or socket that receives the upper portion 15 of the staff extension. A pin 20 passed through perforations in the hub of the cap 19 and through an elongated slot 21 in the said staff extension, holds the cap against displacement. The web of the cap 19 has a dependent marginal flange that surrounds the ratchet teeth 17 and protects the same from dirt and the elements.

At one side, the wheel 16 has a lever receiving opening formed between laterally spaced flanges 22, to which the short end of the brake lever 23 is pivoted. This brake lever, at its said short end has a cam lug 24 that is engageable with the bottom of an annular rim 25 formed on the cap 19 inward of the ratchet teeth 17.

Normally, the lever 23, by gravity, will hang in the position indicated by full lines in Fig. 3, and the cap will be raised so that the ratchet teeth 17 and 18 are out of engagement, thereby leaving the brake staff free to rotate and carry the cap 19 with it. When, however, the lever 23 is turned into an approximately horizontal position shown by dotted lines in Fig. 3, the cam lug 24 is thrown below the rib 25 and the cap 19 will then drop by gravity, so that the ratchet teeth 17 and 18 will be engaged. When the said ratchet teeth are thus engaged, horizontal oscillatory movement of the lever 23 and wheel 16 will, through the cap 19, cause the brake staff to oscillate in one direction with the said lever. Of course, any slack taken up in the chain may be held by engagement of the dog 9 with the ratchet wheel 8, and the brakes when set, may be held by the said dog and ratchet. When the lever 23 is given a return horizontal oscillatory movement, the brake staff and the cap 19 will not be rotated backward therewith, but the ratchet teeth 17 will slip under the ratchet teeth 18 and simply cause the cap 19 to move slightly upward and downward.

When the lever 23 is dropped back to its normal position and the cap 19 raised, the brakes may be released simply by disengaging the dog 9 from the ratchet wheel 8, for, as is evident, at such times, the teeth 18 of the cap 19 are raised out of engagement with the ratchet teeth 17 of the wheel 16.

What we claim is:

1. The combination of a brake staff, of coöperating ratchet members, one free to rotate on said staff and the other held to rotate therewith but slidable thereon, and a lever pivoted to said loose ratchet member, normally hanging in a down-turned position and having a cam projection engaging said sliding ratchet member and holding the same in a released position, the said lever, when in an upturned position, permitting engagement of the said ratchet members and serving, when oscillated, to positively oscillate said loose ratchet member.

2. The combination with a brake staff, of a wheel loose on said staff and having an annular series of upturned ratchet teeth, a cap member rotatable with but slidable on said staff and having an annular series of downturned ratchet teeth for coöperation with the ratchet teeth of said loose wheel, and a lever pivoted to said loose wheel, normally hanging in a downturned position and having a cam lug that then engages the said cap member and holds the same in a raised and released position, and the said lever, when in an upturned position, permitting engagement of the ratchet teeth of said wheel and cap members and when then oscillated, serving to positively oscillate said loose wheel in both directions.

3. The combination with a brake staff, of a wheel loose on said staff and having an annular series of upturned ratchet teeth, a cap member rotatable with but slidable on said staff and having an annular series of downturned ratchet teeth for coöperation with the ratchet teeth of said loose wheel, said cap having inside of its ratchet teeth a depending annular releasing flange, and a lever pivoted to said loose wheel, normally hanging in a downturned position and having a cam lug that then engages the releasing flange of said cap and holds the same and its ratchet teeth in a released position, the said lever when in an upturned position permitting engagement of the ratchet teeth of said cap and loose wheel, and when then oscillated, serving to positively oscillate said loose wheel in both directions.

4. The combination with a brake staff, of a wheel loose on said staff and having an annular series of upturned ratchet teeth, a cap member rotatable with but slidable on said staff and having an annular series of downturned ratchet teeth for coöperation with the ratchet teeth of said loose wheel, said cap having inside of its ratchet teeth a depending annular releasing flange, and having at its outer edge a depending flange that overlaps the annular series of ratchet teeth of said loose wheel, and a lever pivoted to said loose wheel, normally hanging in a downturned position and having a cam lug that then engages the releasing flange of said cap and holds the same and its ratchet teeth in a released position, the said lever when in an upturned position permitting engagement of the ratchet teeth of said cap and loose wheel, and when then oscillated, serving to positively oscillate said loose wheel in both directions.

5. The combination with a brake staff, of coöperating ratchet members, one free to rotate on said staff and the other held to rotate therewith but slidable thereon, a lever pivoted to said loose ratchet member, normally hanging in a downturned position and having a cam projection engaging said sliding ratchet member and holding the same in a released position, the said lever, when in an upturned position, permitting engagement of said ratchet members and serving, when oscillated, to positively oscillate said loose ratchet member, and a ratchet wheel and coöperating dog independent of the above ratchet mechanism, operative to hold said brake staff in the brake-setting position.

In testimony whereof we affix our signatures in presence of two witnesses.

EDWIN W. WEBB.
CHARLES S. WALTON.

Witnesses:
F. L. BARBER,
HARRIETT E. ORR.

Copies of this patent may be obtained for five cents each, by addressing the "Commissioner of Patents, Washington, D. C."